United States Patent [19]

Okura et al.

[11] Patent Number: 5,112,403

[45] Date of Patent: May 12, 1992

[54] COATING COMPOSITION

[75] Inventors: Ken Okura, Tokyo; Satoru Matsuzaki, Iwata; Tsutomu Katamoto; Nanao Horiishi, both of Hiroshima, all of Japan

[73] Assignees: Toda Kogyo Corp., Hiroshima; Dainic Iseika Color & Chemicals Mfg. Co. Ltd, Tokyo, both of Japan

[21] Appl. No.: 756,562

[22] Filed: Sep. 11, 1991

Related U.S. Application Data

[63] Continuation-in-part of Ser. No. 530,862, May 31, 1990, abandoned.

[30] Foreign Application Priority Data

Jun. 5, 1989 [JP] Japan .................................. 1-143811

[51] Int. Cl.$^5$ ............................................. C04B 14/20
[52] U.S. Cl. .................................. 106/418; 106/413; 106/460; 106/459; 106/495; 106/14.05
[58] Field of Search ............... 106/413, 418, 456, 460, 106/459, 495, 500, 14.05

[56] References Cited

U.S. PATENT DOCUMENTS

| | | | |
|---|---|---|---|
| 4,404,254 | 9/1983 | Franz et al. | 428/329 |
| 4,676,838 | 6/1987 | Franz et al. | 106/304 |
| 4,753,829 | 6/1988 | Panush | 427/385.5 |

FOREIGN PATENT DOCUMENTS

| | | |
|---|---|---|
| A319918 | 6/1989 | European Pat. Off. |
| A10306224 | 8/1989 | European Pat. Off. |
| 61-281168 | 12/1986 | Japan |
| 1-263157 | 10/1989 | Japan |

Primary Examiner—William R. Dixon, Jr.
Assistant Examiner—Chris Gallo
Attorney, Agent, or Firm—Nixon & Vanderhye

[57] ABSTRACT

Disclosed herein is a coating composition comprising plate-like iron oxide particles having an average particle diameter of 0.5 to 5.0 μm, a lamellar thickness of 50 to 500Å and a plate ratio (the ratio of the average particle diameter to the lamellar thickness) of 50:1 to 500:1, at least one pigment selected from the group consisting of a coloring pigment, a mica pigment and a metal powder pigment, a film-forming polymer, and an organic solvent.

11 Claims, No Drawings

COATING COMPOSITION

CROSS REFERENCE TO RELATED APPLICATION

The present application is a continuation-in-part of U.S. patent application, Ser. No. 07/530,862 filed on May 31, 1990 abandoned.

BACKGROUND OF THE INVENTION

The present invention relates to a coating composition for protecting the bodies of automobiles or the like and at the same time displaying a soft and bright texture by way of ornament.

For a finish coating of automobiles and bicycles, a method of using a solid color coating and a method of using a metallic coating are mainly adopted.

Inorganic pigments such as titanium dioxide pigments and iron oxide pigments, and organic pigments having excellent weather resistance such as copper phthalocyanine pigments, quinacridone pigments and perylene pigments are usually used for a solid color coating.

For a metallic coating, metal powder such as aluminum powder and mica are used together with the above-described organic pigments or the like so as to display a bright texture.

A coating film formed by using such a metallic coating is required to have a sufficient durability for protecting the substrate and an ornamental property (beautiful appearance).

As the above-described metallic coatings, a metallic coating obtained by mixing granular iron oxide with a metal powder such as aluminum powder or mica is usable. However, from such a coating containing granular iron oxide, a coated product having a characteristic bright texture cannot be produced, because it does not produce a phenomenon of light interference.

The above-described metallic coatings have durability almost sufficient for meeting the market demands, but the aesthetic appearance on the object of coating is not satisfactory in the respect of soft and bright texture.

As a result of the studies undertaken by the present inventors so as to eliminate the above-mentioned defects, it has been found that plate-like iron oxide particles having an average particle diameter of 0.5 to 5.0 μm, a lamellar thickness of 50 to 500 Å and a plate ratio (the ratio of particles diameter to thickness) of 50:1 to 500:1 show a phenomenon of light interference and that by applying a coating composition obtained by mixing these iron oxide particles with a colored pigment, the thus-obtained coated product shows a soft and bright texture which is different from the texture produced by applying a conventional coating composition containing a metal powder or a mica. On the basis of the findings, the present invention has been achieved.

SUMMARY OF THE INVENTION

In an aspect of the present invention, there is provided a coating composition comprising plate-like iron oxide particles having an average particle diameter of 0.5 to 5.0 μm, a lamellar thickness of 50 to 500 Å and a plate ratio of 50:1 to 500:1, at least one pigment selected from the group consisting of a coloring pigment, a mica pigment and a metal powder pigment, a film-forming polymer, and an organic solvent.

DETAILED DESCRIPTION OF THE INVENTION

As plate-like iron oxide particles of raw materials of a coating composition according to the present invention, plate-like hematite particles, plate-like magnetite particles and plate-like maghemite particles which have an average particle diameter of 0.5 to 5.0 μm, a lamellar thickness of 50 to 500 Å and a plate ratio (the ratio of the average particle diameter to the lamellar thickness) of 50:1 to 500:1 may be exemplified. Such the plate-like hematite particles are described in U.S. patent application Ser. No. 07/611,280 filed on Nov. 9, 1990 and European Patent No. 0306224A.

The plate-like hematite particles having an average particle diameter of 0.5 to 5.0 μm, a lamellar thickness of 50 to 500 Å and a plate ratio (the ratio of particles diameter to thickness) of 50:1 to 500:1 according to the present invention are obtained by autoclaving an alkaline suspension of iron (III) hydroxide oxide particles, $FeO_x \cdot Fe_2O_3$ ($0 \leq X \leq 1$) particles or a ferric salt, the alkaline suspension having pH of not less than 9, and containing 0.1 to 15.0 mol of a water-soluble salt based on 1 mol of Fe and an Si-containing compound of 1.5 to 20.0 mol %, expressed as Si, based on the total amount of Fe in the alkaline suspension.

The iron (III) oxide hydroxide particles may have any particle form such as an acicular form and a spindle form that is obtained by a conventional reaction method. It is possible to use a wet-cake obtained by washing a reaction mother liquor containing iron (III) oxide hydroxide with water, a dried wet-cake thereof or the reaction mother liquid.

As the $FeO_x \cdot Fe_2O_3$ ($0 \leq X \leq 1$) particles, for example, a wet-cake obtained by washing with water a reaction mother liquor containing particulate or cubic magnetite particles obtained by the reaction of ferrous salt and an aqueous alkaline solution, a dried wet-cake thereof, the reaction mother liquid thereof, and acicular or spindle $FeO_x \cdot Fe_2O_3$ ($0 \leq X \leq 1$) particles obtained by reducing the above-mentioned acicular or spindle iron (III) oxide hydroxide particles and oxidizing, if necessary, the reduced particles, may be exemplified.

As the ferric salt, ferric chloride, ferric sulfide, ferric nitrate, etc. are usable.

The pH of the alkaline suspension in the present invention is not less than 9, preferably not less than 12. If the pH is less than 9, acicular iron (III) oxide hydroxide particles or $FeO_x \cdot Fe_2O_3$ ($0 \leq X \leq 1$) particles are disadvantageously mixed into the plate-like hematite particles.

The autoclaving method in the present invention is carried out by using an autoclave at a temperature of ordinarily 150° to 330° C., preferably 200° to 300° C., more preferably 250° to 300° C. for 2 to 6 hours. It is a general tendency that the higher the alkali concentration is, the lower is the reaction temperature for producing plate-like hematite particles. If the temperature is lower than 150° C., the suspension contains iron (III) oxide hydroxide, $FeO_x \cdot Fe_2O_3$ ($0 \leq X \leq 1$) or a ferric salt as it is, thereby producing no plate-like hematite particles. If the temperature is higher than 330° C., the production of the plate-like hematite particles is possible, but when the safety of the autoclave is taken into consideration, the upper limit of the temperature is 330° C.

As a water-soluble salt used in the present invention, sulfates, nitrates, chlorides and acetates of alkaline metals may be exemplified.

The amount of water-soluble salt added is 0.1 to 15.0 mol, preferably 0.5 to 10.0 mol, more preferably 3.0 to 5.0 mol based on 1 mol of Fe. By the synergistic effect on the coexistence of the water-soluble salt and Si-containing compound, the plate-like hematite particles having very thin thickness, particularly, the thickness of 50 to 500 Å and relatively large plate ratio, particularly, the plate ratio of 50:1 to 500:1 can be obtained.

If the water-soluble salt added is less than 0.1 mol, the thickness and plate ratio of the plate-like hematite particles produced becomes unfavorable. In particular, since the thickness of the plate-like hematite particles becomes more than 500 Å, the plate ratio of the plate-like hematite particles becomes less than 50:1 and the hue and chroma of the particles becomes low, it is difficult to obtain the target plate-like hematite particles of the present invention. Even if the water-soluble salt added is more than 15 mol, it is possible to obtain the target plate-like hematite particles of the present invention, but the addition of water-soluble salt more than necessary is useless.

As the Si-containing compound used in the present invention, the silicates of potassium and sodium, and colloidal silica may be exemplified.

The Si-containing compound is added so that 1.5 to 20.0 mol %, preferably 5.0 to 15.0 mol %, expressed as Si, is contained in the alkaline suspension based on the total amount of Fe. If the amount of the Si-containing compound added is less than 1.5 mol %, expressed as Si, based on the total amount of Fe, the thickness of the plate-like hematite particles becomes more than 500 Å and, hence, the plate ratio becomes small, so that the plate-like hematite particles take on from red-purple to black purple color. On the other hand, if it is more than 20 mol %, expressed as Si, based on the total amount of Fe, the thickness of the plate-like hematite particles becomes smaller than 50 Å on the basis of the synergistic effect of the water-soluble salt and Si-containing compound, and as a result it is apt to arise the phenomenon of destruction of the particle form.

The water-soluble salt and the Si-containing compound in the present invention exert and influence on the particle form (for example, the plate ratio and the lamellar thickness) and the surface property of the plate-like hematite particles produced. It is, therefore, necessary to add the water-soluble salt and the Si-containing compound before the reaction of producing the plate-like hematite particles.

The water-soluble salt may be added before, simultaneously with, or after the addition of the Si-containing compound.

The average particle diameter and plate ratio of the plate-like hematite particles is apt to be increased in proportion to the amount of water-soluble salt added.

The plate-like magnetite particles having an average particle diameter of 0.5 to 5.0 μm, a lamellar thickness of 50 to 500 Å and a plate ratio of 50:1 to 500:1 according to the present invention are obtained by reducing the thus-obtained plate-like hematite particles at a temperature of 280° to 450° C. in a reducing gas such as hydrogen.

The plate-like maghemite particles having an average particle diameter of 0.5 to 5.0 μm, a lamellar thickness of 50 to 500 Å and a plate ratio (the ratio of the average particle diameter to the lamellar thickness) of 50:1 to 500:1 according to the present invention are obtained by oxidizing the thus-obtained plate-like magnetite particles at a temperature of 200° to 500° C. in an oxygen-containing gas such as air.

Since the plate-like hematite particles show golden color, the plate-like magnetite particles show black-black grey color and the plate-like maghemite particles show liver brown, these particles can be selected in accordance with the objective color.

In a coating composition of the present invention, the amount of the plate-like iron oxide particles used is 0.02 to 90 parts by weight, preferably 1 to 50 parts by weight based on 100 parts by weight of the coating composition.

If it is less than 0.02 part by weight, the coating composition cannot display a sufficient bright texture. If it is more than 90 parts by weight, the physical properties of the coating film tend to lower.

The pigment(s) according to the present invention is at least one selected from the group consisting of a coloring pigment, a metal powder pigment and a mica pigment.

The coloring pigment used in the present invention is one which is used for ordinary coating such as a quinacridone pigment, perylene pigment, copper phthalocyanine pigment, authraquinone pigment, metal complex pigment, transparent iron oxide pigment and carbon black.

As the metal powder pigment, aluminum powder pigments, stainless steel powder pigments, copper powder pigments are usable in the present invention. Among these, aluminum powder pigments are preferably used.

As a mica pigment, known mica pigments are usable in a wide range such as transparent pearl mica, colored mica and interfered mica.

As the film-forming polymer used in the present invention, acrylic resins, acryl melamine resins, vinyl chloride-vinyl acetate copolymers, alkyd resins, polyesters, polyurethanes and amino resins, which are polymers conventionally used in the field of coating, may be exemplified. However, the polymer used in the present invention is not restricted to these resins. The amount of film-forming polymer in the present invention is about 20 to 60 parts by weight, preferably 30 to 40 parts by weight based on 100 parts by weight of the coating composition.

A conventionally well known organic solvent for coatings is used as an organic solvent in which the film-forming polymer is dissolved or dispersed. For example, toluene, xylene, butyl acetate, ethyl acetate, methyl acetate, acetone, methylethyl ketone, methylisobutyl ketone, methanol, ethanol, butanol and cyclohexane are usable. The amount of organic solvent used is 10 to 90 parts by weight, preferably 30 to 70 parts by weight based on 100 parts by weight of the coating composition.

The amount of the pigment(s) according to the present invention is 0.1 to 2000 parts by weight, preferably 3 to 1000 parts by weight based on 100 parts by weight of plate-like iron oxide particles and 0.1 to 90 parts by weight, preferably 0.1 to 60 parts by weight based on 100 parts by weight of the coating composition. If it is less than 0.1 part by weight based on 100 parts by weight of plate-like iron oxide particles, it is difficult to fully display the bright texture in the aesthetic view. On the other hand, if it is more than 2000 parts by weight based on 100 parts by weight of plate-like iron oxide particles, the bright texture of the plate-like iron oxide particles is impaired.

The coloring pigment, the mica pigment and the metal powder pigment may be used singly or in the form of a mixture. The amount of the coloring pigment is not more than 60 parts by weight, preferably 0.1 to 30 parts by weight based on 100 parts by weight of the coating composition. The amount of the mica pigment is not more than 30 parts by weight, preferably 1 to 15 parts by weight based on 100 parts by weight of the coating composition. The amount of the metal powder pigments is not more than 30 parts by weight, preferably 1 to 15 parts by weight based on 100 parts by weight of the coating composition.

A filler, an antistatic agent, a stabilizer, an antioxidant, an ultraviolet absorber, etc. may be added to the coating composition of the present invention, if necessary.

In order to form a coating film by using the coating composition of the present invention, the plate-like iron oxide particles having a lamellar thickness of 50 to 500 Å and a plate ratio of 50:1 to 500:1 and at least one pigment selected from the group consisting of a coloring pigment, a mica pigment and a metal powder pigment are mixed with an organic solvent solution containing a film-forming polymer by a sand mill, a high-speed mixer or the like.

Thus-obtained coating composition is applied on a base plate such as metal plate, glass plate, ceramic plate, plastic plate and enamel plate, a base plate coated by electrodeposition, an undercoated base plate or a second-coated base plate, by spray-coating method, flow-coating method or roll-coating method, and dried to form a colored coat layer. A clear coating agent prepared by dissolving or dispersing a resin similar to the film-forming polymer in an organic solvent, is applied on the colored coating layer as a base coat layer, dried ordinarily and heat-treated to form a coating film.

In the case of preparing a coating composition of the present invention, it is preferable to prepare base coatings by mixing each of plate-like iron oxide particles, coloring pigment and metal powder pigment with organic solvent solution of a film-forming polymer and to mix predetermined amounts of the respective base coatings obtained.

According to the present invention, it is possible to form a coating film having a sufficient bright texture. By forming a colored base-coat layer by applying a coating composition of the present invention onto a base plate such as a metal plate, etc. and further by forming a clear coat layer thereon, it is possible to obtain a coating film having a soft texture, a bright texture and an excellent directional property which cannot be obtained from a conventional metallic coating film.

Thus, a coating composition according to the present invention is optimum as a protecting an ornamenting coating applied to an object such as an automobile and a bicycle.

EXAMPLES

The present invention will be more precisely explained while referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

"Part" and "%" in the Examples and Comparative Examples mean "part by weight" and "% by weight", respectively.

An alkaline suspension of pH 13.8 which was obtained by mixing 0.2 mol of $\alpha$-FeOOH (major axis: 1.0 $\mu$m, BET specific surface area 50.2 $m^2/g$), 0.9 mol of NaCl (which is equivalent to 4.5 mol on the basis of 1 mol of Fe), 4.21 g of water-glass No. 3 ($SiO_2$: 28.55 wt %, containing 10 mol % of Si on the basis of the total amount of Fe) and 1.0 mol of NaOH was heated to 280° C. in an autoclave. This temperature was maintained for 2 hours while mechanically stirring the suspension, thereby producing a yellowish brown precipitate.

After the mixture was cooled to room temperature, the yellowish brown precipitate was filtered out. The precipitate was thoroughly washed with water and then dried.

The particles obtained were hematite particles as shown from the X-ray diffraction pattern. The average particle diameter was 2.5 $\mu$m, the thickness was 240 Å and the plate ratio was 104:1, as is clear from the electron micrograph.

PRODUCTION EXAMPLE 2

An alkaline suspension of pH 13.8 which was obtained by mixing 0.2 mol of $\alpha$-FeOOH (major axis: 1.0 $\mu$m, BET specific surface area 50.2 $m^2/g$), 0.8 mol of $NaNO_3$ (which is equivalent to 4 mol on the basis of 1 mol of Fe), 3.37 g of water-glass No. 3 ($SiO_2$: 28.55 wt %, containing 8 mol % of Si on the basis of the total amount of Fe) and 1.0 mol of NaOH was heated to 280° C. in an autoclave. This temperature was maintained for 2 hours while mechanically stirring the suspension, thereby producing a yellowish brown precipitate.

After the mixture was cooled to room temperature, the yellowish brown precipitate was filtered out. The precipitate was thoroughly washed with water and then dried.

The particles obtained were hematite particles, as shown from the X-ray diffraction pattern. The average particle diameter was 2.4 $\mu$m, the thickness was 350 Å and the plate ratio was 69:1, as is clear from the electron micrograph.

PRODUCTION EXAMPLE 3

An alkaline suspension of pH 13.8 which was obtained by mixing 0.2 mol of $\alpha$-FeOOH (major axis: 1.0 $\mu$m, BET specific surface area 50.2 $m^2/g$), 0.7 mol of $NaNO_3$ (which is equivalent to 3.5 mol on the basis of 1 mol of Fe), 3.79 g of water-glass No. 3 ($SiO_2$: 28.55 wt %, containing 9 mol % of Si on the basis of the total amount of Fe) and 1.0 mol of NaOH was heated to 280° C. in an autoclave. This temperature was maintained for 2 hours while mechanically stirring the suspension, thereby producing a yellowish brown precipitate.

After the mixture was cooled to room temperature, the yellowish brown precipitate was filtered out. The precipitate was thoroughly washed with water and then dried.

1000 g of the thus obtained hematite particles were charged into a retort reducing vessel and $H_2$ gas was blown into the vessel at a rate of 2 l/min, while rotating the vessel and heating to a temperature of 360° C. to reduce them.

The particles obtained was plate-like magnetite particles as shown from the X-ray diffraction pattern. The average particle diameter was 2.4 $\mu$m, the thickness was 280 Å and the plate ratio was 85:1, as is clear from the electron micrograph.

PRODUCTION EXAMPLE 4

An alkaline suspension of pH 13.8 which was obtained by mixing 0.2 mol of α-FeOOH (major axis: 1.0 μm, BET specific surface area 50.2 m²/g), 0.75 mol of $NaNO_3$ (which is equivalent to 3.25 mol on the basis of 1 mol of Fe), 5.05 g of water-glass No. 3 ($SiO_2$: 28.55 wt %, containing 12 mol % of Si on the basis of the total amount of Fe) and 1.0 mol of NaOH was heated to 290° C. in an autoclave. This temperature was maintained for 2 hours while mechanically stirring the suspension, thereby producing a yellowish brown precipitate.

After the mixture was cooled to room temperature, the yellowish brown precipitate was filtered out. The precipitate was thoroughly washed with water and then dried.

1000 g of the thus-obtained hemitete particles were charged into a retort reducing vessel and $H_2$ gas was blown into the vessel at a rate of 2 l/min, while rotating the vessel and heating to a temperature of 360° C. to reduce them.

The particles obtained was plate-like magnetite particles, as shown from the X-ray diffraction pattern. The average particle diameter was 2.5 μm, the thickness was 180 Å and the plate ratio was 139:1, as is clear from the electron micrograph.

PRODUCTION EXAMPLE 5

300 g of the thus-obtained plate-like magnetite particles in the PRODUCTION EXAMPLE 4 were oxidized in air at a temperature of 300° C. for 60 minutes.

The particles obtained was plate-like maghemite particles, as shown from the X-ray diffraction pattern. The average particles diameter was 2.3 μm, the thickness was 180 Å and the plate ratio was 128:1, as is clear from the electron micrograph.

EXAMPLE 1

| (Mixture A) | |
|---|---|
| Plate-like hematite particles [obtained in PRODUCTION EXAMPLE 1 (plate ratio: 104:1, average particle diameter: 2.5 μm, lamellar thickness: 240 Å)] | 30 parts |
| Acryl varnish (solid content: 60%) | 82 parts |
| Melamine varnish (solid content: 60%) | 34 parts |
| Mixture solvent of Solbesso 100 (produced by Tonen Sekiyu Kagaku Co., Ltd.)/ butyl acetate in the weight ratio of 7/3 | 30 parts |
| (Mixture B) | |
| Quinacridone pigment (coloring pigment) | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixtures A and B were respectively dispersed by a sand mill. 90 parts of Mixture A and 10 parts of Mixture B were uniformly mixed to obtain a coating composition (containing 15.3 parts by weight of plate-like hematite particles and 1.7 parts by weight of the quinacridone pigment based on 100 parts by weight of the coating composition).

EXAMPLE 2

| (Mixture C) | |
|---|---|
| Carbon black (coloring pigment) | 10 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixture C was dispersed by a sand mill. 5 parts of Mixture C and 95 parts of Mixture A in Example 1 were uniformly mixed to obtain a coating composition (containing 16.2 parts by weight of plate-like hematite particles and 0.3 part by weight of carbon black based on 100 parts by weight of the coating composition).

EXAMPLE 3

| (Mixture D) | |
|---|---|
| Plate-like hematite particles [obtained in PRODUCTION EXAMPLE 2 (plate ratio: 69:1, average particle diameter: 2.4 μm, lamellar thickness: 350 Å)] | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |
| (Mixture E) | |
| Copper phthalocyanine blue (coloring pigment) | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixtures D and E were respectively dispersed by a sand mill. 95 parts of Mixture D and 5 parts of Mixture E were uniformly mixed to obtain a coating composition (containing 16.2 parts by weight of plate-like hematite particles and 0.9 part by weight of copper phthalocyanine blue based on 100 parts by weight of the coating composition).

EXAMPLE 4

| (Mixture F) | |
|---|---|
| Aluminum pigment (trade name: 7130N, produced by Toyo Aluminum Co., Ltd.) | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixture F was dispersed by a high-speed mixer. 50 parts of Mixture F and 50 parts of Mixture A in Example 1 were uniformly mixed to obtain a coating composition (containing 8.5 parts by weight of plate-like hematite particles and 8.5 parts by weight of the aluminum pigment based on 100 parts by weight of the coating composition).

EXAMPLE 5

| (Mixture G) | |
|---|---|
| Mica pigment (trade name: Fine russet, produced by Male Co., Ltd.) | 30 parts |
| Acryl varnish (solid content: 60%) | 82 parts |
| Melamine varnish (solid content: 60%) | 34 parts |
| Mixture solvent of Solbesso 100/butyl | 30 parts |

| (Mixture G) | |
|---|---|
| acetate in the weight ratio of 7/3 | |

Mixture G was dispersed by a high-speed mixer. 50 parts of Mixture G and 50 parts of Compound D in Example 3 were uniformly mixed to obtain a coating composition (containing 8.5 parts by weight of plate-like hematite particles and 8.5 parts by weight of the mica pigment based on 100 parts by weight of the coating composition).

EXAMPLE 6

| Mixture A | 70 parts |
|---|---|
| Mixture B | 20 parts |
| Mixture G | 10 parts |

Mixtures A, B and G were uniformly mixed to obtain a coating composition (containing 11.9 parts by weight of plate-like hematite particles, 3.4 parts by weight of the quinacridone pigment and 1.7 parts by weight of the mica pigment based on 100 parts by weight of the coating composition.)

EXAMPLE 7

| Mixture A | 50 parts |
|---|---|
| Mixture E | 10 parts |
| Mixture F | 40 parts |

Mixtures A, E and F were uniformly mixed to obtain a coating composition (containing 8.5 parts by weight of plate-like hematite particles, 1.7 parts by weight of copper phthalocyanine blue and 6.8 parts by weight of the aluminum pigment based on 100 parts by weight of the coating composition).

COMPARATIVE EXAMPLE 1

| (Mixture H) | |
|---|---|
| Granular hematite particles (average particle diameter: 0.2 μm) | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixture H was dispersed by a sand mill. 90 parts of Mixture H and 10 parts of Mixture B in Example 1 were uniformly mixed to obtain a coating composition (containing 15.3 parts by weight of granular hematite particles and 1.7 parts by weight of the quinacridone pigment based on 100 parts by weight of the coating composition).

COMPARATIVE EXAMPLE 2

| (Mixture I) | |
|---|---|
| Spindle-shaped hematite particles (major axial diameter: 0.07 μm, aspect ratio (major axial diameter: minor axial diameter): 5:1) | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixture I was dispersed by a sand mill. 90 parts of Mixture I and 10 parts of Mixture B in Example 1 were uniformly mixed to obtain a coating composition (containing 15.3 parts by weight of spindle-shaped hematite particles and 1.7 parts by weight of the quinacridone pigment based on 100 parts by weight of the coating composition).

COMPARATIVE EXAMPLE 3

| Mixture H | 95 parts |
|---|---|
| Mixture C | 5 parts |

Mixtures H and C were uniformly mixed to obtain a coating composition (containing 16.2 parts by weight of granular hematite particles, 0.9 part by weight of carbon black based on 100 parts by weight of the coating composition).

COMPARATIVE EXAMPLE 4

| Mixture H | 95 parts |
|---|---|
| Mixture E | 5 parts |

Mixtures H and E were uniformly mixed to obtain a coating composition (containing 16.2 parts by weight of granular hematite particles, 0.9 part by weight of copper phthalocyanine blue based on 100 parts by weight of the coating composition).

COMPARATIVE EXAMPLE 5

| Mixture I | 95 parts |
|---|---|
| Mixture E | 5 parts |

Mixtures I and E were uniformly mixed to obtain a coating composition (containing 16.2 parts by weight of spindle-shaped hematite particles, 0.9 part by weight of copper phthalocyanine blue based on 100 parts by weight of the coating composition).

COMPARATIVE EXAMPLE 6

| Mixture I | 95 parts |
|---|---|
| Mixture C | 5 parts |

Mixtures I and C were uniformly mixed to obtain a coating composition (containing 16.2 parts by weight of spindle-shaped hematite particles, 0.9 part by weight of carbon black based on 100 parts by weight of the coating composition).

COMPARATIVE EXAMPLE 7

| (Mixture J) | |
|---|---|
| Plate-like hematite particles (plate ratio: 30:1, average particle diameter: 30.0 μm, lamellar thickness: 1.0 μm) | 30 parts |
| Acryl varnish (solid content: 60%) | 82 parts |
| Melamine varnish (solid content: 60%) | 34 parts |
| mixture solvent of Solbesso 100 | 30 parts |

-continued

| (Mixture J) | |
|---|---|
| (produced by Tonen Sekiyu Kagaku Co., Ltd.)/butyl acetate in the weight ratio of 7/3 | |

Mixture J was dispersed by a sand mill. 50 parts of Mixture J and 50 parts of Mixture F in Example 4 were uniformly mixed to obtain a coating composition (containing 8.5 parts by weight of plate-like hematite particles and 8.5 parts by weight of the aluminum pigment based on 100 parts by weight of the coating composition).

COMPARATIVE EXAMPLE 8

| Mixture I | 50 parts |
|---|---|
| Mixture F | 50 parts |

Mixtures I and F were uniformly mixed to obtain a coating composition (containing 8.5 parts by weight of spindle-shaped hematite particles and 8.5 parts by weight of the aluminum pigment based on 100 parts by weight of the coating composition).

COMPARATIVE EXAMPLE 9

| Mixture H | 50 parts |
|---|---|
| Mixture G | 50 parts |

Mixtures H and G were uniformly mixed to obtain a coating composition (containing 8.5 parts by weight of plate-like hematite particles and 8.5 parts by weight of the mica pigment based on 100 parts by weight of the coating composition).

COMPARATIVE EXAMPLE 10

| Mixture I | 50 parts |
|---|---|
| Mixture G | 50 parts |

Mixtures I and G were uniformly mixed to obtain a coating composition (containing 8.5 parts by weight of spindle-shaped hematite particles and 8.5 parts by weight of the mica pigment based on 100 parts by weight of the coating composition).

EXAMPLE 8

| (Mixture K) | |
|---|---|
| Plate-like magnetite particles [obtained in PRODUCTION EXAMPLE 3 (plate ratio: 85:1, average particle diameter: 2.4 μm, lamellar thickness: 280 Å)] | 30 parts |
| Acryl varnish (solid content: 60%) | 82 parts |
| Melamine varnish (solid content: 60%) | 34 parts |
| Mixture solvent of Solbesso 100 (produced by Tonen Sekiyu Kagaku Co., Ltd.)/butyl acetate in the weight ratio of 7/3 | 30 parts |

Mixture K was dispersed by a sand mill. 95 parts of Mixture K and 5 parts of Mixture C in Example 2 were uniformly mixed to obtain a coating composition (containing 16.2 parts by weight of plate-like magnetite particles and 0.3 parts by weight of the carbon black based on 100 parts by weight of the coating composition).

EXAMPLE 9

| (Mixture L) | |
|---|---|
| Plate-like magnetite particles [obtained in PRODUCTION EXAMPLE 4 (plate ratio: 139:1, average particle diameter: 2.5 μm, lamellar thickness: 180 Å)] | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixture L was dispersed by a sand mill. 95 parts of Mixture L and 5 parts of Mixture C in Example 2 were uniformly mixed to obtain a coating composition (containing 16.2 parts by weight of plate-like magnetite particles and 0.3 part by weight of carbon black based on 100 parts by weight of the coating composition).

COMPARATIVE EXAMPLE 11

| (Mixture M) | |
|---|---|
| Granular magnetite particles (average particle diameter: 0.27 μm) | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixture M was dispersed by a sand mill. 95 parts of Mixture M and 5 parts of Mixture C in Example 2 were uniformly mixed to obtain a coating composition (containing 16.2 parts by weight of granular magnetite particles and 0.3 parts by weight of carbon black based on 100 parts by weight of the coating composition).

EXAMPLE 10

| (Mixture N) | |
|---|---|
| Plate-like maghemite particles [obtained in PRODUCTION EXAMPLE 5 (plate ratio: 128:1, average particle diameter: 2.3 μm, lamellar thickness: 180 Å)] | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |
| (Mixture B) | |
| Quinacridone pigment (coloring pigment) | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixtures N and B were respectively dispersed by a sand mill. 90 parts of Mixture N and 10 parts of Mixture B were uniformly mixed to obtain a coating composition (containing 15.3 parts by weight of plate-like maghemite particles and 1.7 parts by weight of the quinacridone pigment based on 100 parts by weight of the coating composition).

COMPARATIVE EXAMPLE 12

| (Mixture O) | |
|---|---|
| Granular maghemite particles (average particle diameter: 0.27 μm) | 30 parts |

-continued

| | |
|---|---|
| Acryl varnish (solid content: 60%) | 82 parts |
| Melamine varnish (solid content: 60%) | 34 parts |
| Mixture solvent of Solbesso 100/butyl acetate in the weight ratio of 7/3 (Mixture E) | 30 parts |
| Copper phthalocyanine blue (coloring pigment) | 30 parts |
| Acryl varnish (solid content: 60%) | 82 parts |
| Melamine varnish (solid content: 60%) | 34 parts |
| Mixture solvent of Solbesso 100/butyl acetate in the weight ratio of 7/3 | 30 parts |

Mixtures O and E were respectively dispersed by a sand mill. 90 parts of Mixture O and 10 parts of Mixture E were uniformly mixed to obtain a coating composition (containing 15.3 parts by weight of granular maghemite particles and 1.7 part by weight of copper phthalocyanine blue based on 100 parts by weight of the coating composition).

The composition of the coating compositions is Examples 1 to 10 and Comparative Examples 1 to 12 are shown in Table 2.

The coating compositions obtained in Examples 1 to 10 and Comparative Examples 1 to 12 were diluted with a thinner to a viscosity suitable for spraying (15 sec by Ford cup No. 4), and is sprayed to a steel panel having an irregular surface by an air spray gun. After the obtained panel was dried for 10 minutes, the resultant panel was subjected to clear coating (acryl melamine) by an air spray gun. After the obtained panel was dried at room temperature for 15 minutes, it was baked for curing at 140° C. for 30 minutes.

The aesthetic appearance of each panel obtained was evaluated. The results are shown in Table 1.

TABLE 1

| | Bright texture | Directional property | Soft texture | $L^*_{45}/L^*_{-45}$ |
|---|---|---|---|---|
| Ex. | | | | |
| 1 | 3 | 4 | 5 | 2.1 |
| 2 | 3 | 4 | 5 | 1.9 |
| 3 | 3 | 4 | 5 | 1.8 |
| 4 | 4 | 4 | 3 | 1.5 |
| 5 | 3 | 4 | 4 | 2.2 |
| 6 | 3 | 4 | 4 | 2.3 |
| 7 | 4 | 4 | 5 | 2.5 |
| 8 | 3 | 4 | 5 | 1.6 |
| 9 | 3 | 4 | 5 | 1.5 |
| 10 | 3 | 4 | 5 | 1.7 |
| Comp. Ex. | | | | |
| 1 | 1 | 1 | 1 | 1.1 |
| 2 | 1 | 2 | 1 | 1.2 |
| 3 | 1 | 1 | 1 | 1.0 |
| 4 | 1 | 1 | 1 | 1.0 |
| 5 | 1 | 2 | 1 | 1.1 |
| 6 | 1 | 2 | 1 | 1.0 |
| 7 | 2 | 2 | 1 | 1.3 |
| 8 | 5 | 3 | 1 | 2.7 |
| 9 | 1 | 1 | 1 | 1.2 |
| 10 | 3 | 3 | 3 | 1.3 |
| 11 | 1 | 1 | 1 | 1.0 |
| 12 | 1 | 1 | 1 | 1.0 |

Aesthetic appearance was evaluated in five stages ranging from 5 meaning best to 1 meaning worst.

$L^*_{45}/L^*_{-45}$ is the ratio of the lightness of acceptance angles $+45°$ and $-45°$, at where the incidence light is $-70°$. In this case, vertical line to the paint film surface is regarded as 0°. This $L^*_{45}/L^*_{-45}$ value shows the difference of lightness when the paint film is projected to the light at different angle, so called the down-flop effect.

The measurement was made by a gonio-photometer color measurement system GCMS-3 sold by Murakami Color Research. The larger value of $L^*_{45}/L^*_{-45}$ means the more effect of down-flop, and in the case of $L^*_{45}/L^*_{-45} \approx 1$, the down-flop effect comes negligible. It is necessary for purpose of the present invention that $L^*_{45}/L^*_{-45} \geq 1.5$.

The bright texture is expressed by a sensory value in proportion to the quantity of reflected light at positive angle to incident light, in other words, what is called a glittering appearance. It is necessary for the purpose of the present invention that the evaluation of the bright texture is not less than 3.

The directional property means the difference of color tone between the reflected light at positive angle and negative angle, when the incident light comes at a certain negative angle, in other words, it is called "flip-flop" effect. It is necessary for the purpose of the present invention that the evaluation of the directional property is not less than 3.

The soft texture is the sensory value which is related to the distribution of positive reflected light. The softer the texture is, the wider is the half width of the distribution of positive reflected light. This is the sensory value of the denseness of what is called a glittering appearance. It is necessary for the purpose of the present invention that the evaluation of the soft texture is not less than 3.

TABLE 2

| | Iron oxide particles (based on 100 parts by weight of the coating composition) | Pigment | | | | | Film forming polymer (based on 100 parts by weight of the coating composition) | Organic solvent (based on 100 parts by weight of the coating composition) |
|---|---|---|---|---|---|---|---|---|
| | | (based on 100 parts by weight of the iron oxide particles) | (based on 100 parts by weight of the coating composition) | Coloring pigment (based on 100 parts by weight of the coating composition) | Mica pigment (based on 100 parts by weight of the coating composition) | Metal powder pigment (based on 100 parts by weight of the coating composition) | | |
| Example 1 | 15.3 | 11.1 | 1.7 | 1.7 | — | — | 39.8 | 43.2 |
| Example 2 | 16.2 | 18.5 | 0.3 | 0.3 | — | — | 39.8 | 43.7 |
| Example 3 | 16.2 | 5.6 | 0.9 | 0.9 | — | — | 39.8 | 43.2 |
| Example 4 | 8.5 | 100 | 8.5 | — | — | 8.5 | 39.8 | 43.2 |
| Example 5 | 8.5 | 100 | 8.5 | — | 8.5 | — | 39.8 | 43.2 |
| Example 6 | 11.9 | 42.9 | 5.1 | 3.4 | 1.7 | — | 39.8 | 43.2 |
| Example 7 | 8.5 | 100 | 8.5 | 1.7 | — | 6.8 | 39.8 | 43.2 |
| Example 8 | 16.2 | 1.85 | 0.3 | 0.3 | — | — | 39.8 | 43.7 |
| Example 9 | 16.2 | 1.85 | 0.3 | 0.3 | — | — | 39.8 | 43.7 |
| Example 10 | 15.3 | 11.1 | 1.7 | 1.7 | — | — | 39.8 | 43.7 |

TABLE 2-continued

| | Iron oxide particles (based on 100 parts by weight of the coating composition) | Pigment | | | | | Film forming polymer (based on 100 parts by weight of the coating composition) | Organic solvent (based on 100 parts by weight of the coating composition) |
| | | (based on 100 parts by weight of the iron oxide particles) | (based on 100 parts by weight of the coating composition) | Coloring pigment (based on 100 parts by weight of the coating composition) | Mica pigment (based on 100 parts by weight of the coating composition) | Metal powder pigment (based on 100 parts by weight of the coating composition) | | |
|---|---|---|---|---|---|---|---|---|
| Comparative Example 1 | 15.3 | 11.1 | 1.7 | 1.7 | — | — | 39.8 | 43.2 |
| Comparative Example 2 | 15.3 | 11.1 | 1.7 | 1.7 | — | — | 39.8 | 43.2 |
| Comparative Example 3 | 16.2 | 5.6 | 0.9 | 0.9 | — | — | 39.8 | 43.7 |
| Comparative Example 4 | 16.2 | 5.6 | 0.9 | 0.9 | — | — | 39.8 | 43.2 |
| Comparative Example 5 | 16.2 | 5.6 | 0.9 | 0.9 | — | — | 39.8 | 43.2 |
| Comparative Example 6 | 16.2 | 5.6 | 0.9 | 0.9 | — | — | 39.8 | 43.7 |
| Comparative Example 7 | 8.5 | 100 | 8.5 | — | — | 8.5 | 39.8 | 43.2 |
| Comparative Example 8 | 8.5 | 100 | 8.5 | — | — | 8.5 | 39.8 | 43.2 |
| Comparative Example 9 | 8.5 | 100 | 8.5 | — | 8.5 | — | 39.8 | 43.2 |
| Comparative Example 10 | 8.5 | 100 | 8.5 | — | 8.5 | — | 39.8 | 43.2 |
| Comparative Example 11 | 16.2 | 1.85 | 0.3 | 0.3 | — | — | 39.8 | 43.7 |
| Comparative Example 12 | 15.3 | 11.1 | 1.7 | 1.7 | — | — | 39.8 | 43.7 |

What is claimed is:

1. A coating composition comprising plate-like iron oxide particles having an average particle diameter of 0.5 to 5.0 μm, a lamellar thickness of 50 to 500 Å and a plate ratio (the ratio of the average particle diameter to the lamellar thickness) of 50:1 to 500:1, at least one pigment selected from the group consisting of a coloring pigment, a mica pigment and a metal powder pigment, a film-forming polymer, and an organic solvent.

2. A coating composition according to claim 1, wherein the amount of said film-forming polymer is 20 to 60 parts by weight based on 100 parts by weight of said coating composition.

3. A coating composition according to claim 1, wherein the amount of said organic solvent is 10 to 90 parts by weight based on 100 parts by weight of said coating composition.

4. A coating composition according to claim 1, wherein the amount of said plate-like iron oxide particles is 0.02 to 90 parts by weight based on 100 parts by weight of said coating composition.

5. A coating composition according to claim 1, wherein the amount of the pigment is 0.1 to 90 parts by weight based on 100 parts by weight of said coating composition and 0.1 to 2,000 parts by weight based on 100 parts by weight of said plate-like iron oxide particles.

6. A coating composition according to claim 5, wherein an amount of the coloring pigment is not more than 60 parts by weight based on 100 parts by weight of said coating composition.

7. A coating composition according to claim 5, wherein the amount of the mica pigment is not more than 30 parts by weight based on 100 parts by weight of said coating composition.

8. A coating composition according to claim 5, wherein the amount of the metal powder pigment is not more than 30 parts by weight based on 100 parts by weight of said coating composition.

9. A coating composition according to claim 1, wherein said plate-like iron oxide particles are plate-like hematite particles having an average particle diameter of 0.5 to 5.0 μm, a lamellar thickness of 50 to 500 Å and a plate ratio (the ratio of the average particle diameter to the lamellar thickness) of 50:1 to 500:1.

10. A coating composition according to claim 1, wherein said plate-like iron oxide particles are plate-like magnetite particles having an average particle diameter of 0.5 to 5.0 μm, a lamellar thickness of 50 to 500 Å and a plate ratio (the ratio of the average particle diameter to the lamellar thickness) of 50:1 to 500:1.

11. A coating composition according to claim 1, wherein said plate-like iron oxide particles are plate-like maghemite particles having an average particle diameter of 0.5 to 5.0 μm, a lamellar thickness of 50 to 500 Å and a plate ratio (the ratio of the average particle diameter to the lamellar thickness) of 50:1 to 500:1.

* * * * *

UNITED STATES PATENT AND TRADEMARK OFFICE
CERTIFICATE OF CORRECTION

PATENT NO. : 5,112,403
DATED : May 12, 1992
INVENTOR(S) : OKURA et al

It is certified that error appears in the above-identified patent and that said Letters Patent is hereby corrected as shown below:

Title page Item [73] Assignees: Second assignee should be corrected to read "Dainichiseika" Color & Chemicals Mfg. Co.

Signed and Sealed this

Third Day of August, 1993

Attest:

MICHAEL K. KIRK

Attesting Officer

Acting Commissioner of Patents and Trademarks